United States Patent [19]

Schwien et al.

[11] 4,095,706

[45] Jun. 20, 1978

[54] VERTICALLY SWINGING BIG BALE HANDLING AND GRASPING APPARATUS

[75] Inventors: Harold B. Schwien; Paul A. Schwien, both of Bazine, Kans.

[73] Assignee: Nichols, Farrow, Schwien and Schwien, Wichita, Kans.

[21] Appl. No.: 786,224

[22] Filed: Apr. 11, 1977

[51] Int. Cl.[2] ................................................ B60P 1/04

[52] U.S. Cl. ......................... 214/147 G; 214/DIG. 4; 214/1 HA; 242/86.5 R

[58] Field of Search ........ 214/147 R, 147 G, DIG. 4, 214/1 HA; 294/111; 242/86.5 R

[56] References Cited

U.S. PATENT DOCUMENTS

| | | | |
|---|---|---|---|
| 561,674 | 6/1896 | Kuriger | 214/147 G X |
| 2,908,526 | 10/1959 | Nelson | 294/111 X |
| 3,877,595 | 4/1975 | Edelman | 214/147 G X |
| 3,908,846 | 9/1975 | Brummitt | 214/147 G |
| 3,968,940 | 7/1976 | Godbersen | 214/DIG. 4 X |

FOREIGN PATENT DOCUMENTS

| | | | |
|---|---|---|---|
| 903,306 | 8/1962 | United Kingdom | 214/147 G |

*Primary Examiner*—Frank E. Werner
*Attorney, Agent, or Firm*—Phillip A. Rein

[57] ABSTRACT

This invention is a big bale handling apparatus to be moved through a trailer hitch and operable to load, convey, and unload large hay bales presently used in the farming industry. More particularly, the big bale handling apparatus includes an A-frame assembly resembling a boat trailer and having a bale connector means mounted thereon. The bale connector means includes a main support frame assembly having 1st and 2nd actuator arm assemblies mounted thereon, each having a bale connector assembly operable to grasp and hold a cylindrical bale member. A bale control assembly is operably connected to the bale connector means to control movement of the 1st and 2nd actuator arm assemblies in order to selectively grasp, lift, rotate, convey, lower, unload and unravel the bale member.

6 Claims, 6 Drawing Figures

VERTICALLY SWINGING BIG BALE HANDLING AND GRASPING APPARATUS

Numerous devices are known to the prior art operable to lift and convey the conventional rectangular box-type hay bales. Additionally, elaborate devices are available to be used with farm tractors to lift and convey the large, modern, cylindrical hay bales but they are not operable in a manner similar to applicant's structure.

In one preferred embodiment of this invention, a big bale handling apparatus is provided including a basic support means, a bale connector means mounted on the basic support means; and a drive means mounted on the basic support means and operably connected to the bale connector means. The bale connector means resembles a boat trailer including an A-frame assembly mounted on a wheel support assembly and having a hitch assembly connectable to a conventional bumper hitch. The bale connector means includes a main support frame assembly rotatably mounted on the A-frame assembly; first and second actuator arm assemblies operable to grasp a large bale member; and a bale control assembly to operate and control the first and second actuator arm assemblies. The drive means includes a winch assembly and power apparatus operable to control the bale connector means to grasp, load, convey, and unload large bale members.

One object of this invention is to provide a big bale handling apparatus that is relatively inexpensive to operate, simple to use, and readily connectable to various vehicles having bumper hitches thereon.

Another object of this invention is to provide a big bale handling apparatus having a pair of cooperating actuator arm assemblies to selectively grasp, lift, convey, unload and unravel a large bale member.

One further object of this invention is to provide a big bale handling apparatus operable through conventional vehicle electrical power or hydraulic pressure to move about large bale members.

Still, one other object of this invention is to provide a big bale handling apparatus that is sturdy in construction, easy to move, reliable in operation, and attractive in appearance.

Various other objects, advantages, and features of the invention will become apparent to those skilled in the art from the following discussion, taken in conjunction with the accompanying drawings, in which.

Figure 1:
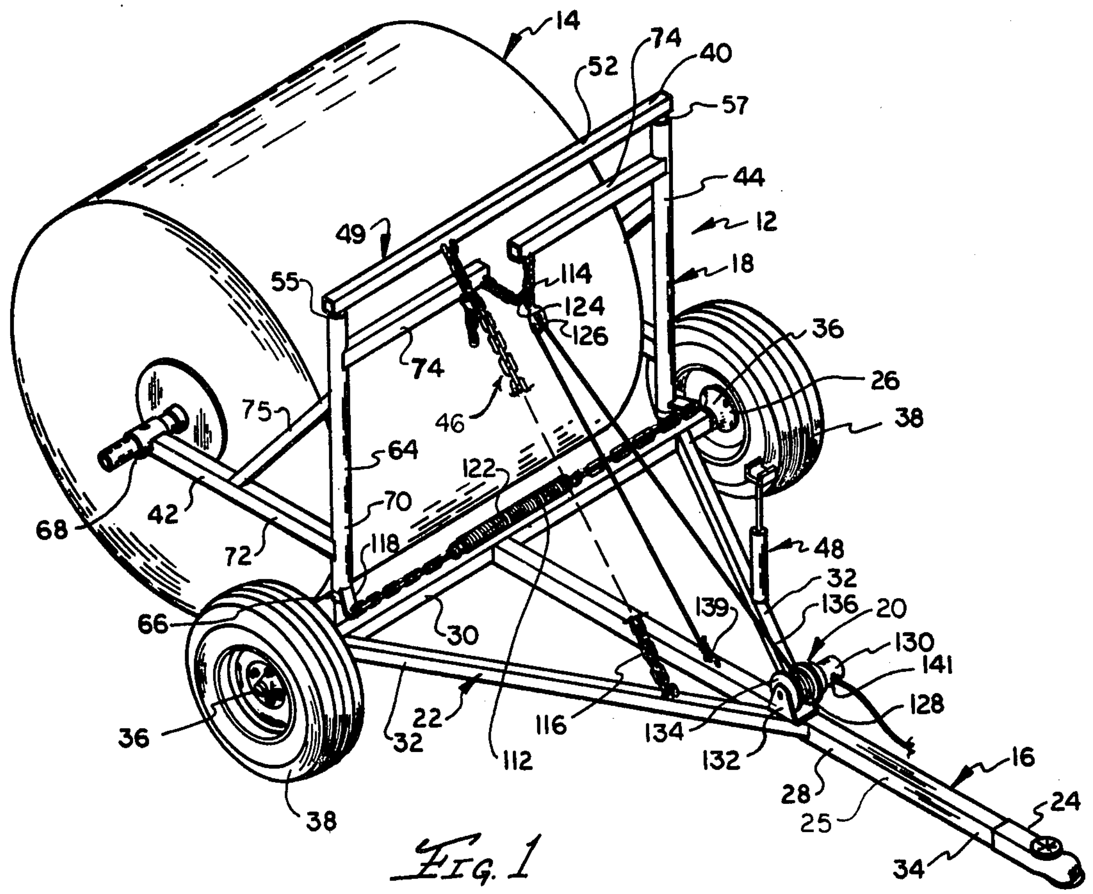
FIG. 1 is a perspective view of a bale handling apparatus of this invention having a large bale member mounted thereon.

The following is a discussion and description of preferred specific embodiments of the new big bale handling apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a bale handling apparatus of this invention, indicated generally at 12, is shown as having a large bale member 14 mounted thereon. The bale handling apparatus 12 includes a basic support means 16 resembling a conventional boat trailer frame; a bale connector means 18 mounted on the basic support means 16 operable to grasp and move the large bale members 14; and a drive means 20 mounted on the basic support means 16 and operably connected to the bale connector means 18.

Figure 2:
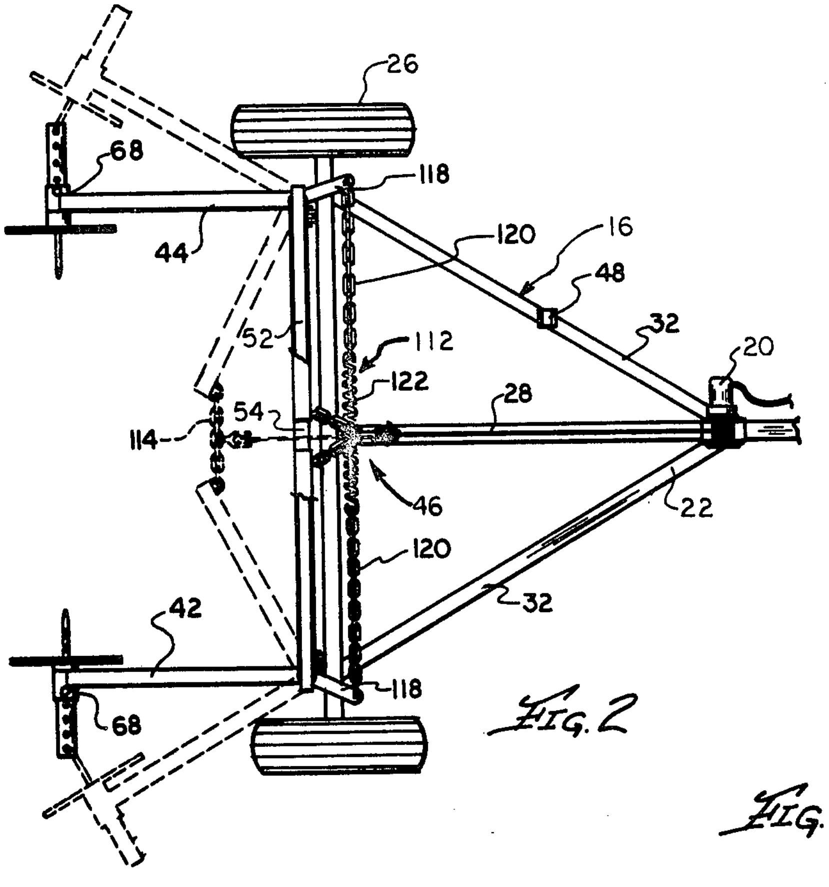
FIG. 2 is a top plan view of the bale handling apparatus having movement of first and second actuator arm assemblies shown in dotted lines.

As best shown in FIGS. 1 and 2, the basic support means 16 includes an A-frame assembly 22; a hitch assembly 24 mounted on a forward portion 25 of the A-frame assembly 22; and a wheel support assembly 26 on which the A-frame assembly 22 is mounted. The A-frame assembly 22 is of square tubular construction having a central elongated, tongue support member 28; an axle support member 30 secured to one end of the tongue support member 28 and extended transversely thereof; and a pair of lateral support members 32 secured at opposite ends to the tongue support member 28 and the axle support member 30 respectively.

Figure 4:
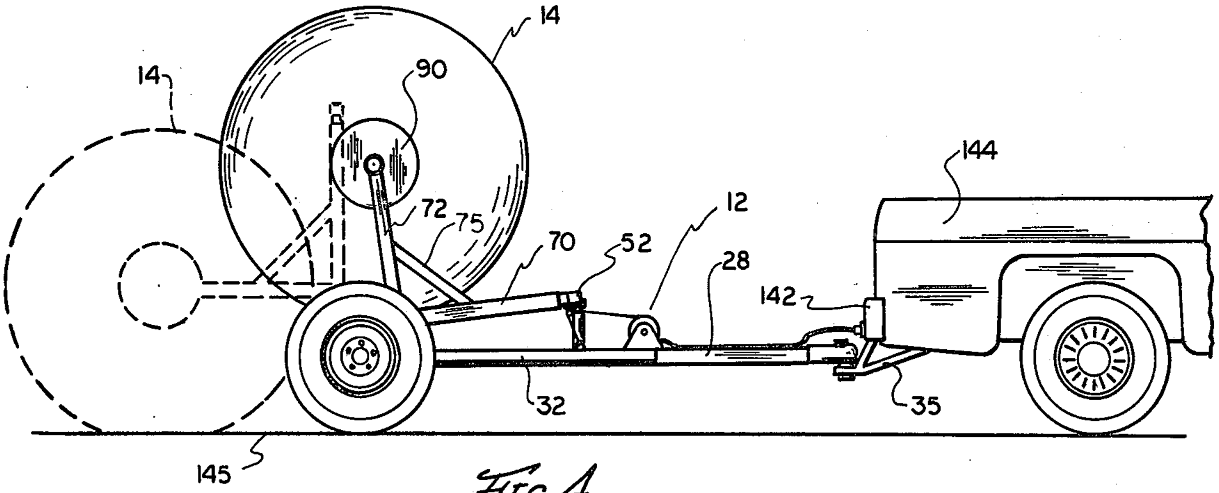
FIG. 4 is a side elevational view of the bale handling apparatus of this invention connected to a pickup truck illustrating movement of a large bale member from loaded to unloaded condition.

The tongue support member 28 has an outer end 34 having the hitch assembly 24 mounted thereon. The hitch assembly 24 is of a conventional nature operable to be connected to a ball member (not shown) on a bumper hitch 35 (FIG. 4).

The wheel support assembly 26 includes, mounted on each outer end of the axle support member 30, a hub support member 36 having a tire wheel member 38 rotatably mounted thereon. The conventional brake system (not shown) is present in the tire wheel members 38 being operable in a conventional manner.

The bale connector means 18 includes a main support frame assembly 40; first and second actuator arm assemblies 42, 44 connected to the main support frame assembly 40; a bale control assembly 46 operably connected to the actuator arm assemblies 42, 44; and a resilient frame support assembly 48 secured to the basic support means 16. The main support frame assembly 40 includes a basic frame assembly 49 and a connector assembly 51 to pivotably connect the basic frame assembly 49 to the axle support member 30.

Figure 5:
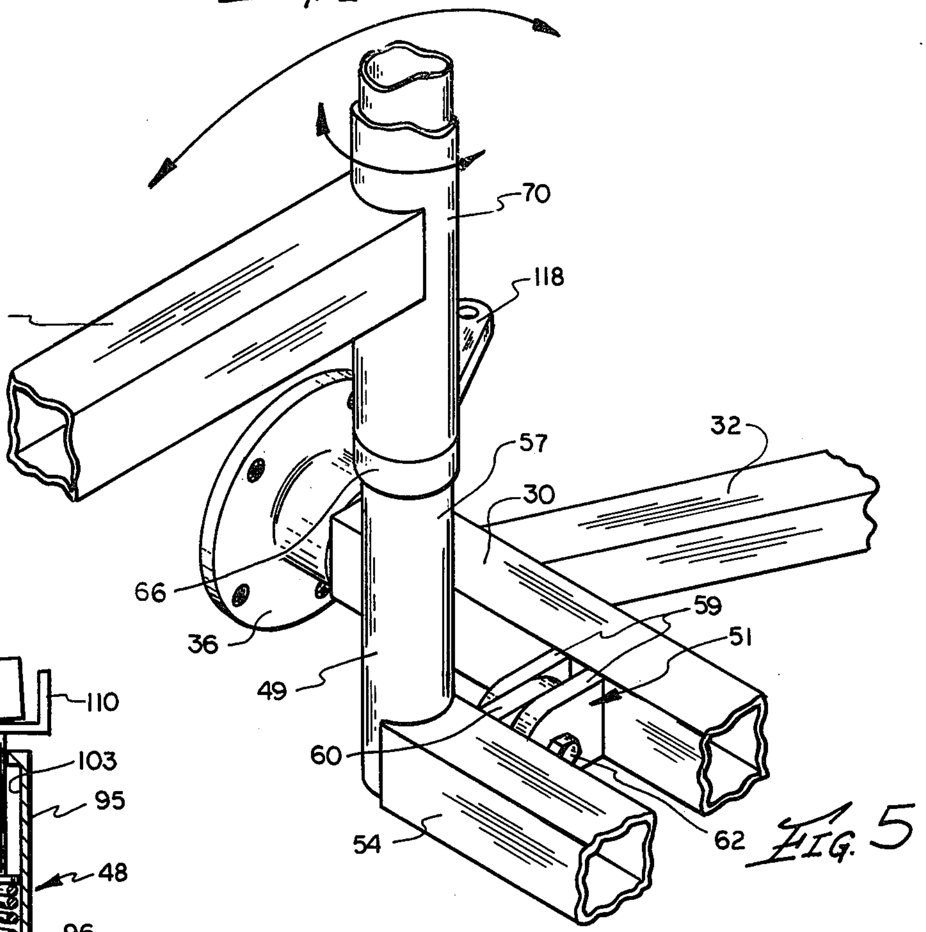
FIG. 5 is an enlarged fragmentary perspective view of the pivotal connections allowing movement of the bale handling apparatus of this invention.

The basic frame assembly 49 includes upper and lower, parallel tube members 52, 54 connected at opposite ends to first and second, vertical, parallel pipe members 55, 57. The upper and lower tube members 52, 54 are of square shape in transverse cross section and secured as by welding to the pipe members 55, 57. As shown in FIG. 5, the pipe member 57 is circular in transverse cross section (as is pipe member 55) to permit rotation of the actuator arm assemblies 42, 44 thereon as will be explained.

As best seen in FIG. 5, the connector assembly 51 includes two spaced sets of parallel adjacent connector lugs 59 pivotably connected to a laterally, extended, anchor lug 60 through a support bolt or pin 62. The connector lugs 59 are secured as by welding to the axle support members 30. Each anchor lug 60 is also secured as by welding to the adjacent lower tube member 54.

As the first actuator arm assembly 42 is substantially identical to the second actuator arm assembly 44, only one need be described in detail. As seen in FIGS. 1 and 2, the first actuator arm assembly 42 includes an actuator frame assembly 64; a support collar member 66 mounted on the pipe member 55; and a bale connector assembly 68 secured to the actuator frame assembly 64.

The actuator frame assembly 64 includes an upright cylindrical, support member 70; first and second support arms 72 and 74 secured to and extended perpendicular to the upright support member 70 and perpendicular to each other; and a struct member 75 extended between and secured to the first support arm 72 and the upright support member 70. The first and second support arms 72, 74 are of square tubular construction to achieve the desired strength. The strut member 75 is a brace member to achieve the required strength with a minimum of weight required.

As shown in FIG. 5, the collar member 66 is of circular shape and secured to the first pipe member 55 or second pipe member 57 as by a lock pin or set screw (not shown). The collar member 66 operates to vertically support the upright support member 70 thereon.

Figure 3:
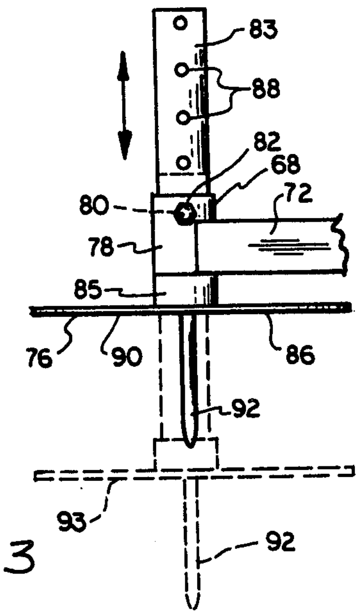
FIG. 3 is an enlarged, fragmentary top plan view of an adjustable bale connector assembly of the bale handling apparatus of this invention.

As shown in FIGS. 1, 2, and, more particularly described in FIG. 3, the bale connector assembly 68 includes a connector disc assembly 76 connected to a support coupling 78 which, in turn, is secured as by welding to the outer end of the first support arm 72. The support coupling 78 has aligned holes 80 therein with a lock pin 82 to hold the connector disc assembly 76 in a desired adjusted position as will be explained.

The connector disc assembly 76 includes a support shaft 83 secured through a connector collar 85 to a disc assembly 86. The support shaft 83 is of cylindrical shape and having a plurality of aligned, spaced, adjustment holes 88 for axial adjustment relative to the support coupling 78.

The disc assembly 86 includes a circular disc member 90 having a laterally extended spike member 92 mounted at the center thereof. The disc member 90 has a considerable inner area indicated at 93 for frictional contact with the large bale member 14 in a manner to be described. The spike member 92 extends about twelve inches or more to penetrate the respective large bale members 14.

As previously mentioned, the second actuator arm assembly 44 contains the above identified elements as they pertain to the first actuator arm assembly 42.

Figure 6:
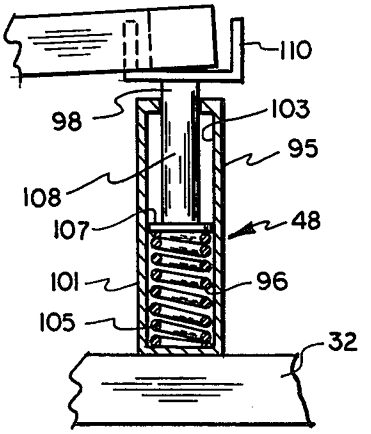
FIG. 6 is a fragmentary, side elevational view of a resilient frame support assembly of the bale handling apparatus of this invention.

As shown in FIG. 6, the resilient frame support assembly 48 includes a housing member 95; a biasing member 96 mounted in the housing member 95; and a support plunger member 98 mounted against the biasing member 96 and within the housing member 95. The housing member 95 is of cylindrical shape with an upright wall 101 defining an opening 103 and secured at a lower end as by welding to the lateral support member 32. The biasing member 96 is a compression spring 105 to provide upward biasing force against the support plunger member 98. The support plunger member 98 includes a bottom plate 107 welded to a support column 108 having a U-shaped cradle member 110 connected thereto.

The bale control assembly 46 includes an adjustable biasing assembly 112; a chain connector assembly 114; and a retaining chain assembly 116. The adjustable biasing assembly 112 includes a lug element 118 secured to each lower end of the respective upright support members 70; a chain element 120 secured to each of the lug elements 118; and a tension spring 122 having opposite ends connected to respective ones of the chain elements 120. The adjustable biasing assembly 112 operates to bias the respective first and second actuator arm assemblies 42, 44 outwardly in a manner to be described.

The chain connector assembly 114 includes a chain member 124 having opposite ends secured to adjacent ends of the second support arms 74 and a pulley member 126 secured to a midpoint of the chain member 124. The pulley member 126 is connected to the drive means 20.

As shown in FIGS. 1 and 2, the drive means 20 includes a winch assembly 128 mounted on the A-frame assembly 22 and having a power apparatus 130 connected thereto.

The winch assembly 128 includes a spool support member 132 secured as by welding to the junction of the lateral support members 32 and the tongue support members 28; a spool member 134 rotatably mounted on the spool support member 132; and a control cable 136 adapted to be wound on the spool member 134. The winch assembly 128 operates in a conventional manner having the control cable 136 trained through the pulley member 126 and connected to a U-shaped hook member 139 which is secured to the tongue support member 28.

The power apparatus 130 is a drive motor 141 which can be electrically powered or hydraulically driven as required by the pulling vehicle.

In the use and operation of the big bale handling apparatus 12 of this invention, the hitch assembly 24 is readily connected to a bumper member 142 as shown in FIG. 4 to be pulled by a vehicle such as a tractor or pickup truck 144. The big bale handling apparatus 12 is backed up to a large bale member 14 so as to place same between the first and second actuator arm assemblies 42, 44. The disc members 90 are aligned to a position about center height relative to the large bale member 14.

On operation of the drive means 20, the control cable 136 is retracted onto the spool member 134 on operation of the electrical or hydraulic power apparatus 130. As shown in FIG. 2, this causes rotation of the second support arms 74 and concurrent inward movement of the first support arms 72. This is force applied against the biasing force of the adjustable biasing assembly 112. The spike members 92 penetrate the large bale member 14 until compression contact of the disc members 90 stops further penetration.

Further retraction of the control cable 136 causes the entire basic frame assembly 49 to rotate with the large bale member 14 about the connector assembly 51 as shown in FIG. 4. This movement is continued until the upper tube member 52 rests within the cradle member 110 against the force of the compression spring 105 (FIG. 6). In this position, the large bale member 14 is positioned forwardly past its center of gravity for stability to transport.

On reaching the desired destination of the large bale member 14, the drive motor 141 can be released in a controlled manner with the compression spring 105 acting to move the basic frame assembly 49 upwardly past the center of gravity of the bale member 14. The movement continues until limited by the retaining chain assembly 116 whereupon the entire big bale handling apparatus 12 can be moved forwardly to achieve controlled unrolling of the large bale member 14.

However, if one wishes to unload the compacted bale member 14, the further releasing of the control cable 136 with the bale member 14 resting on a support surface 145 would cause the first and second actuator arm assemblies 42, 44 to move outwardly under force of the tension spring 122 of the bale control assembly 46 to the position shown in dotted lines in FIG. 2. This would cause the spike members 92 to be free from the bale member 14 so the big bale handling apparatus 12 could move away therefrom.

For transport purposes without a large bale member 14 to convey, the first and second actuator arm assemblies 42, 44 are moved inwardly to the position shown in FIG. 2 and upwardly to the position shown in FIG. 4, both these views in solid lines.

It is noted that the big bale handling apparatus of this invention is of solid construction and easy to operate with a minimum of controls. The big bale handling apparatus can be used with various pulling vehicles and, therefore, does not entail a large capital expense which may be used infrequently.

While the invention has been described in conjunction with preferred specific embodiments thereof, it will be understood that this description is intended to illustrate and not to limit the scope of the invention, which is defined by the following claims.

I claim:

1. A farm implement being a big bale handling apparatus operable to load, convey, and unload large bale members, comprising:

(a) a basic support assembly adapted to be connected to a conventional bumper hitch for conveyance purposes;

(b) a bale connector means mounted on said basic support assembly;

(c) a drive means connected to said bale connector means to power same;

(d) said bale connector means including a main support frame assembly connected to said basic support assembly and having first and second actuator arm assemblies pivotably connected to said main support frame assembly;

(e) each of said first and second arm assemblies having a bale connector assembly;

(f) said bale connector assemblies movable inwardly to grasp the large bale member and pivotal about a horizontal axis vertically to raise and lower the large bale member;

(g) said bale connector means having a connector assembly pivotably connecting said main support frame assembly to said support assembly;

(h) said connector assembly having said horizontal axis defining the pivotal movement of said bale connector assemblies;

(i) said first and second actuator arm assemblies each including a support member having first and second support arms secured thereto;

(j) said first support arms extended rearwardly and having said bale connector assemblies connected thereto;

(k) said second support arms connected to said drive means to control movement of said bale connector assemblies to grasp, convey, and unload the large bale member;

(l) said first and second support arms are extended perpendicular to said support member and to each other; and (m) said second support arms having inner adjacent ends positioned midway between said support members to achieve a substantial torque action between said first and second support arms.

2. A big bale handling apparatus as described in claim 1, wherein:

(a) each of said bale connector assemblies having a connector disc assembly connected to a support coupling;

(b) said connector disc assembly having a disc member with an inwardly projecting spike member secured to a center of said disc member; and (c) said connector disc assembly adjustably connected to said support coupling and movable relative thereto and locked in an adjusted position with a lock pin to be usable on large bale members of various widths;

whereby said spike member is operable to penetrate the large bale member and grasp same between said disc members for lifting and conveying.

3. A big bale handling apparatus as described in claim 1, wherein:

(a) the longitudinal axis of said first and second support arms positioned a substantial distance apart on respective ones of said support member to provide a substantial torque effect on said bale connector assemblies on movement of said second support arms forwardly.

4. A farm implement being a big bale handling apparatus operable to load, convey, and unload large bale members, comprising:

(a) a basic support assembly adapted to be connected to a conventional bumper hitch for conveyance purposes;

(b) a bale connector means mounted on said basic support assembly;

(c) a drive means connected to said bale connector means to power same;

(d) said bale connector means including a main support frame assembly connected to said basic support assembly and having first and second actuator arm assemblies pivotably connected to said main support frame assembly;

(e) each of said first and second arm assemblies having a bale connector assembly;

(f) said bale connector assemblies movable inwardly to grasp the large bale member and pivotal about a horizontal axis vertically to raise and lower the large bale member;

(g) said drive means connected to said first and second actuator arm assemblies, said drive means operable in a first movement to move said first and second actuator arm assemblies inwardly to grasp the large bale member;

(h) said drive means operable in a second movement to pivot said first and second actuator arm assemblies about said horizontal axis to raise the large bale member for conveyance purposes;

(i) said bale connector assembly having a resilient frame support assembly connected to said basic support assembly; and (j) said frame support assembly having a plunger member biased upwardly to control one of said second support arms in said second movement to hold said bale connector means in the loaded, transport position.

5. A big bale handling apparatus as described in claim 4, wherein:

(a) said plunger member includes a U-shaped cradle member to receive said one of said second support arms while in the loaded condition.

6. A big bale handling apparatus as described in claim 5, wherein:

(a) said frame support assembly includes a compression spring to contact and urge said cradle member upwardly, whereby said compression spring acts to bias said first and second actuator arm assemblies to aid in unloading the large bale member.

* * * * *